H. J. BRENNECKE.
MECHANIC'S EYE PROTECTOR.
APPLICATION FILED MAR. 18, 1915.
1,193,230.
Patented Aug. 1, 1916.
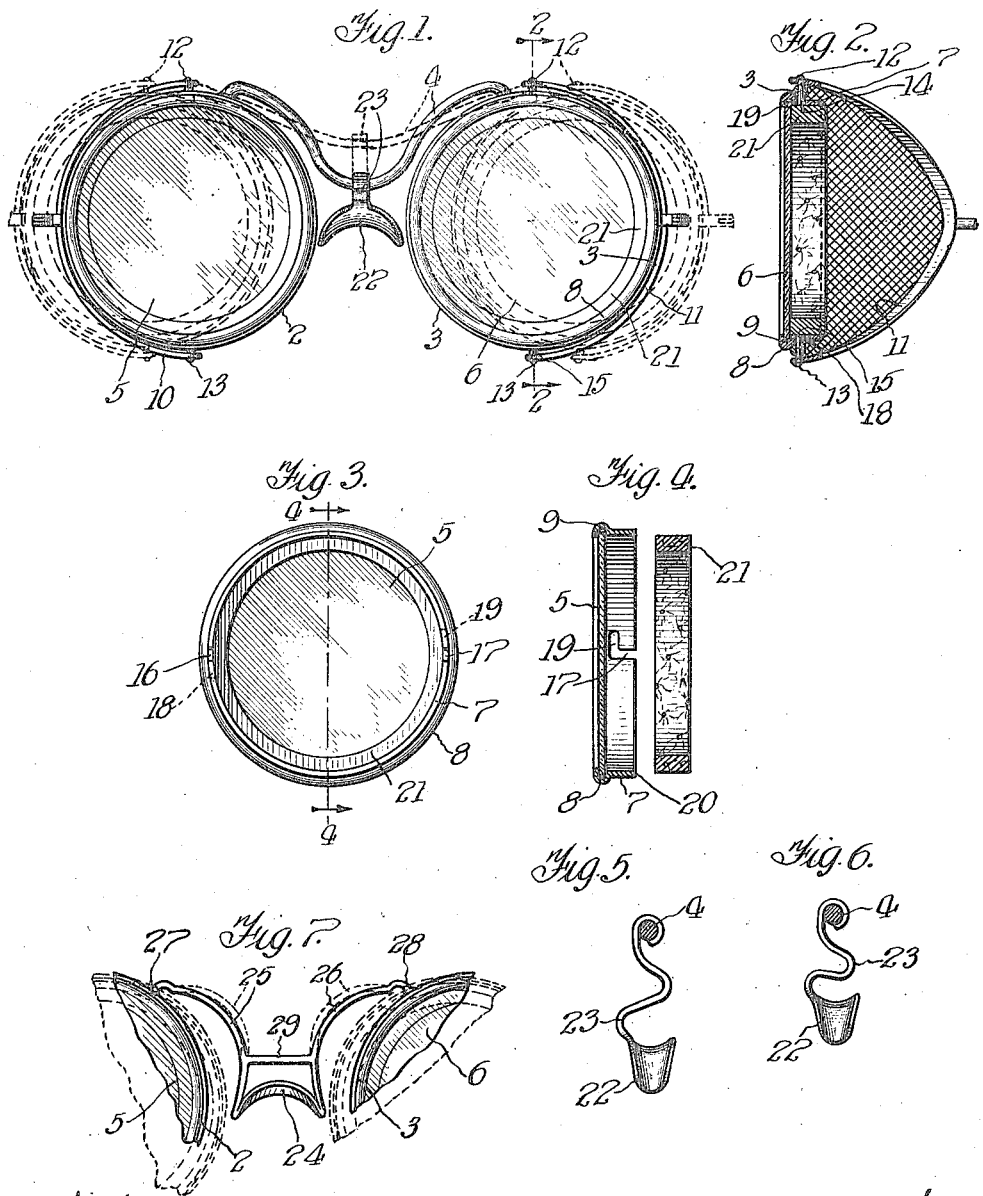
Witness:—
A. J. Sauser.
Inventor:
HERMAN J. BRENNECKE
By Thomas Beckstrom
Atty.

UNITED STATES PATENT OFFICE.

HERMAN J. BRENNECKE, OF CHICAGO, ILLINOIS, ASSIGNOR OF ONE-HALF TO ROBERT MALCOLM, OF CHICAGO, ILLINOIS.

MECHANIC'S EYE-PROTECTOR.

1,193,230.

Specification of Letters Patent.  Patented Aug. 1, 1916.

Application filed March 18, 1915. Serial No. 15,218.

*To all whom it may concern:*

Be it known that I, HERMAN J. BRENNECKE, a citizen of the United States, residing at Chicago, in the county of Cook and State of Illinois, have invented certain new and useful Improvements in Mechanics' Eye-Protectors, of which the following is a specification.

My invention relates to goggles of the type used by mechanics for the purpose of protecting the eyes against dust and flying particles, extreme heat, etc. Employers commonly provide their employees with these goggles, and owing to frequent breakage of lenses, lenses made useless by pitting, and linings of fiber face-contacting portions becoming dirty and insanitary, replacements and repairs constitute a considerable item of expense. Furthermore a large assortment of sizes must be kept in stock as well as reserve supplies to take the place of goggles or eye-protectors out of service during repairs.

The objects of the present invention are to do away with the necessity of keeping more than one size in stock and to make this size flexible, variable or adjustable to different forms of faces, noses, and distances between wearers' eyes; to make the lenses removable from the frame, or instantaneously exchangeable with new lenses or glasses, and to make the fiber lining also instantaneously renewable, so as to obviate taking the frames out of service for such repairs and replacements.

With these objects in view the invention consists of the novel construction, combination and arrangement of parts all as hereinafter described in detail, illustrated in the accompanying drawing and incorporated in the appended claims.

In the drawing Figure 1 is a rear side view of a pair of eye-protectors or goggles embodying my invention, the bows or temples being broken away. Fig. 2 is a section taken substantially on line 2—2 of Fig. 1. Fig. 3 is a face view of the lens removed from the frame. Fig. 4 is a section taken on line 4—4 of Fig. 3. Figs. 5 and 6 are views of the nose piece and its contractible and extensible support showing the manner of changing the position of the nose-piece support with the change of its position indicated by dotted lines in Fig. 1. Fig. 7 is a modification of the expansible and contractible portion of the frame.

In the several views the frame consists of two rings of wire or recessed frame portions 2 and 3 connected by a wire bridge soldered to the high portions of said rings at or near their median vertical lines or planes and curving away from them and then U-shape down between then toward their median horizontal line or plane. By expanding this long-armed U or straightening out the middle curve as indicated by dotted lines, simple means are provided for varying the length of the bridge and the distance between the lenses 5 and 6. By contracting the U they are moved closer together, the expansion being indicated by dotted lines in Fig. 1. Each of the lenses is mounted in a frame or band 7 formed with a bead 8 which serves as a stop limiting the movement of the lens in the frame rearwardly, or toward the face. The formation of this bead provides on the inner periphery of the band a channel 9 in which the lens or glass 5 or 6 is held as shown in Fig. 4. Each of the usual side shields made of wire gauze, labeled 10 and 11, is mounted on pivot studs 12 and 13 which are secured to the ring of the frame in any suitable manner as by driving short pieces of wire into holes in the ring as shown in Fig. 2. These studs project beyond both the outer and the inner periphery of the ring, the inner projecting ends being labeled 14 and 15. These inner ends serve as locking pins for securing the lens frame 7 in the ring of the frame, the band 7 being provided for this purpose with a pair of horizontal slots 16 and 17 which lead into vertical slots 18 and 19, the latter two projecting in opposite directions as indicated in Fig. 3.

Fig. 4 shows clearly the arrangement of each pair of slots 16 and 18 and 17 and 19. By engaging the studs 14 and 15 with the slots 16 and 17 and pressing in the lens frame until the pins register, or are in line with the slots 18 and 19 and then slightly turning the band or frame 7, the latter will be locked against movement away from the frame or ring in which it is held. The inner edge of the band or frame 7, separately designated in Fig. 4 by the numeral 20, is usually lined with chenille or cloth sewed onto said edge, for which purpose the band is provided with needle holes to receive the thread. In the present invention a removable lining is provided in the form of a cork ring 21 which in Figs. 1, 2 and 3 is shown in position in the frame while Fig. 4 shows it removed from the frame or band 7. When this lining, which may be made of any suitable material other than cork, becomes dirty or germ laden it may be pulled out and another ring instantly pressed into position, friction alone being relied upon to hold it in place. Thus several workmen may use the same goggles free from each others' perspiration on the lining by simply carrying individual linings and when the lining becomes soiled a clean one may be substituted without taking the goggles to the repair shop and thus necessitating a substitute pair of goggles, or extra set, while repairs are taking place. Obviously the tearing out and sewing in of new linings takes as much time for only one pair of goggles as is required to refit dozens of pairs with the cork rings 21. These cork rings are also a better protection against transmission of heat from the goggles to the face where a workman is exposed to great heat.

Figs. 1, 5 and 6 show how the nose-piece is caused to remain in the same position relative to the lenses when the U-bend in its support has its position changed as indicated by the dotted lines. The nose-piece 22 is mounted on the lower end of a band of metal which forms a support 23 in which are several bends which may be bent toward closed position or opened up to vary the distance between the bridge 4 and the nose-piece.

Fig. 7 shows a modification adapted for the smaller and more usual variations in distance between lenses. In this figure the bridge and nose piece are substantially one piece, the nose-piece 24 connecting two curved arms 25 and 26, the upper ends of which have U-shaped bends secured to the rings 2 and 3 of the frame. Immediately above the nose-piece a cross bar 29 connects the arms and serves as a supporting brace for the arms and nose-piece.

In operation the individual user adjusts the lenses the proper distance apart for his eyes by pushing the ends of the bridge 4 toward each other to narrow the distance or pulls them apart to widen the distance, and if one of the lenses becomes broken or pitted he removes it from the frame by turning the band 7 of the lens so as to bring the studs 14 and 15 into line with the slots 16 and 17, then pulls out the lens with its bands and inserts a new lens by reversing the operation. As indicated in the foregoing, the lining or cork ring 21 is removed without disturbing any other part of the goggle, by simply pulling it out.

I claim as my invention—

1. The combination with an eye-protector, of a frame having receptacles therein, a pair of lens frames, means for instantaneously interlocking said lens frames with and releasing them from said frame, a bridge adjustable to vary the spacing apart of the lens frames and the lenses therein, a nose-piece, and support for same which is adjustable to vary the level of the lenses relative to said nose-piece.

2. The combination with the lens supporting bands or frames of an eye protector, of removable fiber lining for the edges of said bands or frames.

3. The combination with the lens frames of a pair of eye-protectors, of a ring of cork or fibrous material lining the inner periphery of said frame, said ring being removably mounted in said frame.

4. The combination with a pair of eye-protectors, said eye-protectors comprising a frame consisting of lens receptacles connected by a bridge, lenses and fibrous lining, of means for adjustably varying the distance between said lenses, means for supporting the fibrous lining by friction hold only, a nose-piece mounted on said bridge, and means for varying the distance of said nose-piece from said bridge.

In testimony whereof I have hereunto subscribed my name.

HERMAN J. BRENNECKE.